United States Patent
Ochi

(10) Patent No.: US 10,400,706 B2
(45) Date of Patent: Sep. 3, 2019

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Yuta Ochi, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 112 days.

(21) Appl. No.: 15/088,619

(22) Filed: Apr. 1, 2016

(65) Prior Publication Data
US 2016/0290273 A1    Oct. 6, 2016

(30) Foreign Application Priority Data

Apr. 3, 2015   (JP) ................................. 2015-077072

(51) Int. Cl.
*F02D 41/40*    (2006.01)
*F02D 41/30*    (2006.01)
(Continued)

(52) U.S. Cl.
CPC .......... *F02D 41/403* (2013.01); *F02B 23/101* (2013.01); *F02D 41/3023* (2013.01);
(Continued)

(58) Field of Classification Search
CPC ............ F02D 41/3047; F02D 41/3023; F02D 41/402; F02D 41/403; F02D 2041/389;
(Continued)

(56) References Cited

U.S. PATENT DOCUMENTS 6,125,816 A * 10/2000 Inoue ............... F02B 17/005
                                                    123/295
7,188,587 B1 * 3/2007 Quader ............ B60W 10/06
                                                    123/26
(Continued)

FOREIGN PATENT DOCUMENTS

CN      102057151A A   5/2011
EP         1344922 A2   9/2003
(Continued)

OTHER PUBLICATIONS

Reference Nishida JP 2012193657 A Machine Tranlastion.*

*Primary Examiner* — Hung Q Nguyen
*Assistant Examiner* — Brian P Monahon
(74) *Attorney, Agent, or Firm* — Hunton Andrews Kurth LLP

(57) ABSTRACT

Embodiments of the present invention prevent the occurrence of rapid or intense self-ignition of fuel in an internal combustion engine that performs diesel combustion using a fuel having a relatively high self-ignition temperature. Pre-combustion is brought about by spark ignition during the compression stroke. Thereafter, main injection by an in-cylinder injection valve is performed before the top dead center of the compression stroke. In consequence, combustion of the fuel injected by the main injection is started by flame generated by the pre-combustion, and self-ignition and diffusion combustion of fuel occurs subsequently. Moreover, in at least a part of the operation range of the internal combustion engine, middle injection is performed at a time after the spark ignition of the pre-injected fuel and before the main injection. The fuel injected by the middle injection is burned by propagation of flame.

3 Claims, 10 Drawing Sheets

(51) Int. Cl.
*F02P 5/04* (2006.01)
*F02P 5/15* (2006.01)
*F02B 23/10* (2006.01)
*F01N 3/20* (2006.01)
*F01N 3/035* (2006.01)

(52) U.S. Cl.
CPC ............ *F02D 41/402* (2013.01); *F02P 5/045* (2013.01); *F02P 5/1502* (2013.01); *F01N 3/035* (2013.01); *F01N 3/2066* (2013.01); *F02B 2023/102* (2013.01); *F02B 2023/103* (2013.01); *Y02T 10/125* (2013.01); *Y02T 10/44* (2013.01); *Y02T 10/46* (2013.01)

(58) Field of Classification Search
CPC .............. F02B 23/101; F02B 2023/102; F02B 2023/103; F02P 5/045; Y02T 10/125; Y02T 10/44; F01N 3/035; F01N 3/2066
See application file for complete search history.

(56) References Cited

U.S. PATENT DOCUMENTS

| | | | |
|---|---|---|---|
| 8,616,163 B2* | 12/2013 | Huebner | F02D 13/0265 123/48 AA |
| 2005/0022513 A1* | 2/2005 | Kitahara | F01N 3/0814 60/285 |
| 2007/0023003 A1* | 2/2007 | Oechsle | F02D 41/3023 123/299 |
| 2007/0056553 A1* | 3/2007 | Kohler | F02B 23/101 123/295 |
| 2009/0272363 A1* | 11/2009 | Yun | F02B 1/12 123/295 |
| 2009/0292447 A1* | 11/2009 | Yamaguchi | F02D 35/023 701/103 |
| 2010/0242902 A1* | 9/2010 | Kang | F02D 41/3035 123/305 |
| 2011/0011061 A1* | 1/2011 | Yamakawa | F02D 13/0234 60/285 |
| 2011/0023454 A1* | 2/2011 | Kurtz | F02D 41/024 60/274 |
| 2011/0023467 A1* | 2/2011 | Kong | F02D 41/029 60/287 |
| 2011/0056459 A1 | 3/2011 | Nada | |
| 2012/0000197 A1* | 1/2012 | Maruyama | F02D 41/0057 60/605.2 |
| 2012/0000441 A1* | 1/2012 | Nakai | F02D 41/0087 123/299 |
| 2012/0004826 A1* | 1/2012 | Shimo | F02D 41/3035 701/103 |
| 2012/0042849 A1* | 2/2012 | Sangkyu | F02B 37/013 123/294 |
| 2013/0073186 A1* | 3/2013 | Morinaga | F02D 13/0207 701/104 |
| 2013/0080039 A1* | 3/2013 | Nakamoto | F02D 41/009 701/113 |
| 2013/0118163 A1* | 5/2013 | Nishimura | F02D 41/0255 60/605.1 |
| 2013/0138328 A1* | 5/2013 | Shimo | F02D 41/062 701/104 |
| 2013/0218440 A1* | 8/2013 | Styron | F02D 41/3017 701/105 |
| 2014/0014062 A1* | 1/2014 | Yacoub | F02B 17/005 123/295 |
| 2014/0014066 A1* | 1/2014 | Yacoub | F02D 17/02 123/406.23 |
| 2014/0019028 A1* | 1/2014 | Yacoub | F02D 41/0082 701/103 |
| 2014/0025278 A1* | 1/2014 | Gwidt | F02D 35/028 701/105 |
| 2014/0366846 A1* | 12/2014 | Ikemoto | F02D 41/247 123/472 |
| 2016/0123251 A1 | 5/2016 | Ochi et al. | |

FOREIGN PATENT DOCUMENTS

| | | | |
|---|---|---|---|
| JP | 2002-276442 A | | 9/2002 |
| JP | 2003-254105 A | | 9/2003 |
| JP | 2003-269229 A | | 9/2003 |
| JP | 2008-169714 A | | 7/2008 |
| JP | 2008169714 A | * | 7/2008 |
| JP | 2012-193657 A | | 10/2012 |
| JP | 2012193657 A | * | 10/2012 |
| WO | 2014192147 A1 | | 12/2014 |

* cited by examiner

FUEL SPRAY

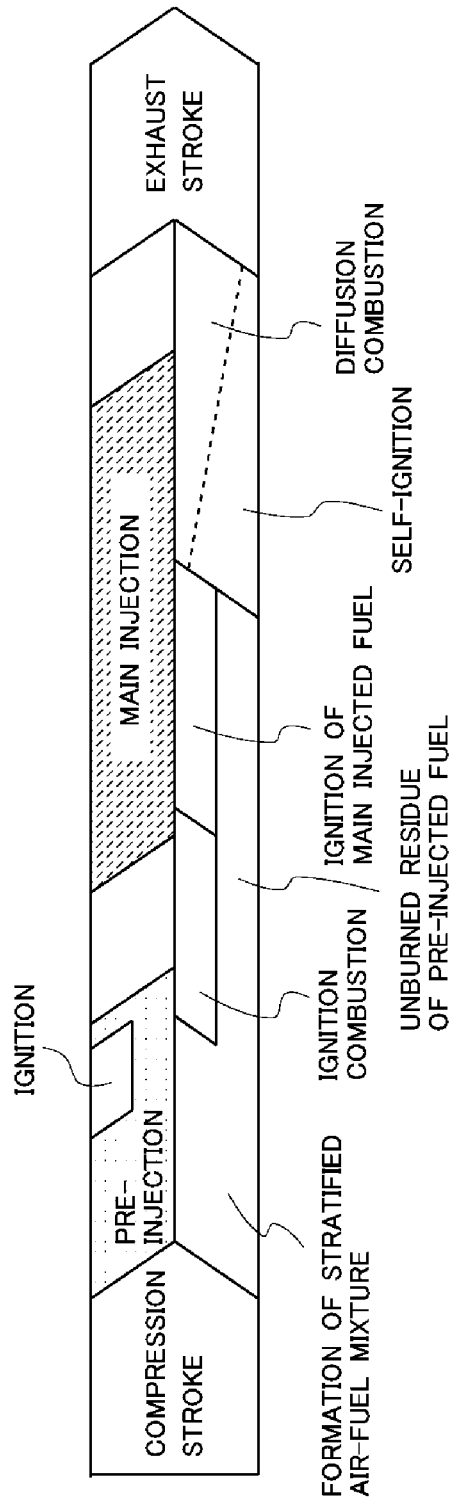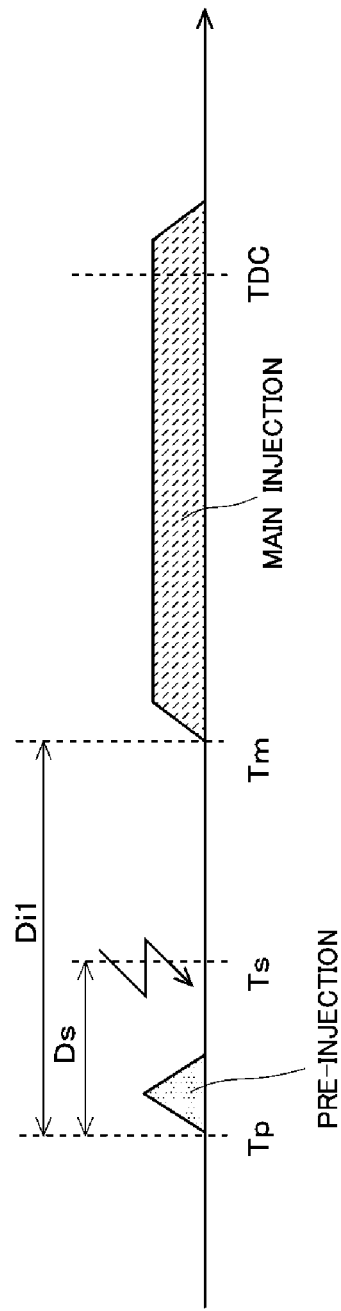
FIG. 3A
FIG. 3B

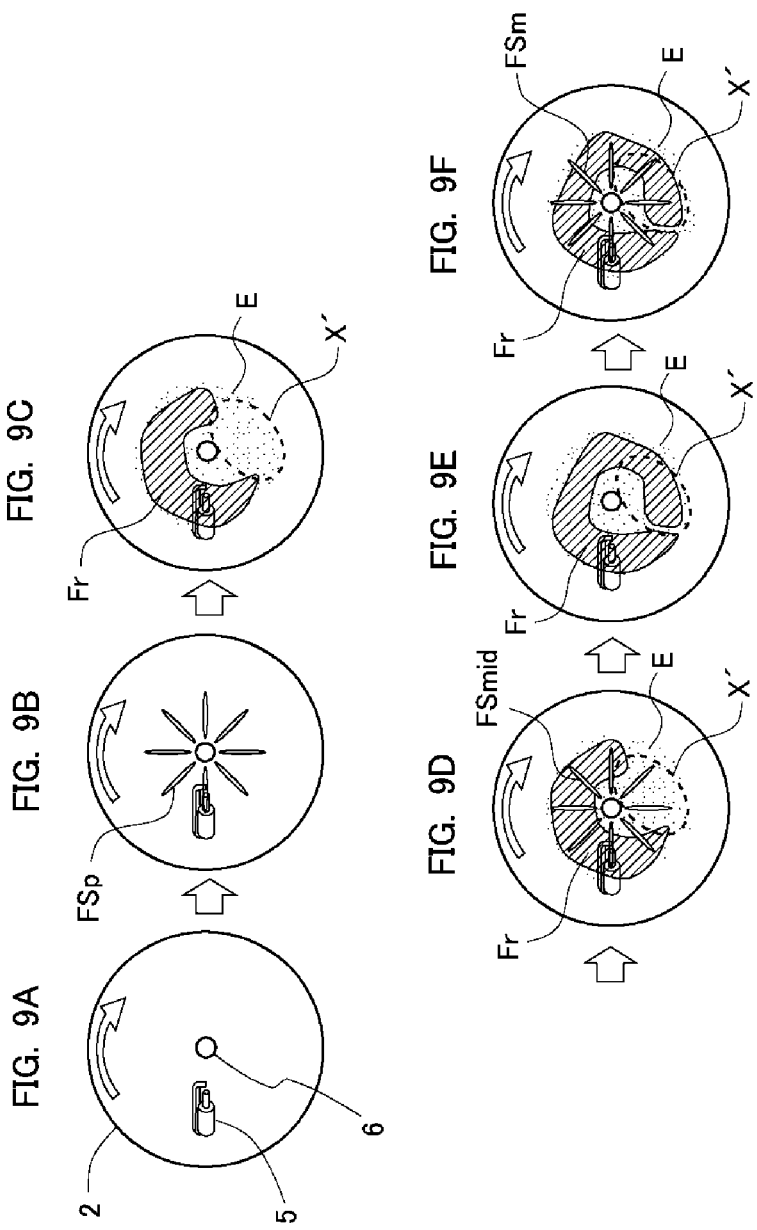

CONTROL APPARATUS FOR INTERNAL COMBUSTION ENGINE

CROSS-REFERENCE TO RELATED APPLICATION

The present application claims priority to Japanese Patent Application No. 2015-077072 filed on Apr. 3, 2015, which is incorporated herein by reference in its entirety.

BACKGROUND OF THE INVENTION

Field of the Invention

Embodiments of the present invention relate to a control apparatus for an internal combustion engine.

Description of the Related Art

Diesel combustion, in which fuel is directly injected into compressed air in the combustion chamber, self-ignites, and is burned by diffusion combustion, has a higher thermal efficiency as compared to combustion by spark ignition. In recent years, in order to enjoy this advantage of diesel combustion also in gasoline engines, technology for causing gasoline to self-ignite and burn by diffusion combustion has been developed.

For example, in the technology disclosed in Japanese Patent Application Laid-Open No. 2002-276442, first fuel injection is performed by an in-cylinder injection valve during the period in the first half of the compression stroke to produce substantially homogenous air-fuel mixture in the entirety of the combustion chamber. Then, the air-fuel mixture produced by the first fuel injection is spark-ignited. Thereafter, second fuel injection is performed to burn the injected fuel. With this combustion, the temperature and pressure in the combustion chamber rise to cause the remaining fuel to self-ignite.

Japanese Patent Application Laid-Open No. 2003-254105 discloses a technology enabling diesel combustion using as fuel natural gas or the like having a relatively high self-ignition temperature. According to Japanese Patent Application Laid-Open No. 2003-254105 disclosing this technology, fuel injection is performed in a predetermined spark-ignition region in the combustion chamber in an early or middle stage of the compression stroke to form an air-fuel mixture that can be spark-ignited. Then, the air-fuel mixture formed in the spark-ignition region is ignited at a time immediately before the top dead center of the compression stroke to bring about combustion by spark ignition. Thus, a high-temperature, high-pressure condition enabling self-ignition of natural gas is established in the combustion chamber. Thereafter, fuel is injected directly into the combustion chamber in a high-temperature, high-pressure condition, so that the injected fuel is burned by diesel combustion.

SUMMARY

Technical Problem

An object of embodiments of the present invention is to prevent the occurrence of rapid or intense self-ignition of fuel in an internal combustion engine that performs diesel combustion using a fuel having a relatively high self-ignition temperature, such as gasoline.

Solution to Problem

An internal combustion engine to which embodiments of the present invention are applied has a fuel injection valve that injects fuel radially from a location near the center of the combustion chamber. In the internal combustion engine, pre-injection is performed by the fuel injection valve during the compression stroke, and the fuel injected by the pre-injection (which will be sometimes referred to as "pre-injected fuel" hereinafter) is spark-ignited. Thereafter, main injection by the fuel injection valve is started before the top dead center of the compression stroke. Thus, combustion of the fuel injected by the main injection (which will be sometimes referred to as "main injected fuel" hereinafter) is started by a flame generated by the spark ignition of the pre-spray, and self-ignition and diffusion combustion of fuel occur subsequently.

In embodiments of the present invention, in at least a part of the operation range of the internal combustion engine, middle injection is performed by the fuel injection valve in addition to the pre-injection and the main injection. The middle injection is performed at a time after the spark-ignition of the pre-injected fuel and before the main injection. The fuel injected by the middle injection (which will be sometimes referred to as "middle injected fuel" hereinafter) is burned by propagation of flame. It should be noted that in the context of embodiments of the present invention, the terms "pre-injection", "middle injection", and "main injection" are used only to distinguish injections performed by the fuel injection valve in one combustion cycle for convenience of description.

More specifically, a control apparatus for an internal combustion engine according to embodiments of the present invention includes a fuel injection valve that injects fuel radially from a location near the center of a combustion chamber of the internal combustion engine. An ignition plug is provided whose position relative to said fuel injection valve is set in such a way that a part of fuel spray injected through said fuel injection valve passes through an ignition-capable region and the ignition plug can ignite the fuel spray directly. A controller is also provided comprising at least one processor configured to perform pre-injection through said fuel injection valve at a pre-injection time during the compression stroke, ignites pre-spray, which is fuel spray formed by the pre-injection, by the ignition plug, and starts to perform main injection through the fuel injection valve at a main injection time after the ignition of the pre-spray by the ignition plug and before the top dead center of the compression stroke that is set in such a way that combustion of the fuel injected by the main injection is started by flame generated by ignition of the pre-spray, thereby causing self-ignition of fuel to occur and causing at least a portion of the fuel injected by the main injection to be burned by diffusion combustion. In at least a part of the operation range of the internal combustion engine, the controller performs middle injection in addition to the pre-injection and the main injection in one combustion cycle at a middle injection time after the ignition of the pre-spray by the ignition plug and before the main injection time to inject a quantity of fuel smaller than the quantity of fuel injected by the pre-injection in the same combustion cycle through the fuel injection valve, thereby causing the fuel injected by the middle injection to be burned by propagation of flame starting from flame generated by the ignition of the pre-spray.

The fuel injection valve in the apparatus according to an embodiment of the present invention injects fuel radially from a location near the center of the combustion chamber. In this apparatus, the pre-injection is performed at the pre-injection time during the compression stroke, and the pre-spray formed by the pre-injected fuel is directly ignited by the ignition plug. Thus, what is called spray guide combustion is brought about. The spray guide combustion caused by ignition of the pre-spray will be sometimes referred to as "pre-combustion" hereinafter. Furthermore, the main injection is performed at the main injection time after the time of ignition of the pre-spray. Although the main injection is started at a time before the top dead center of the compression stroke, it may continue past the top dead center of the compression stroke.

In embodiments of the present invention, the pre-injection time, the ignition time, and the main injection time are set in such a way that combustion of the main injected fuel is started by a flame generated by the pre-combustion. After combustion of the main injected fuel is started, the temperature and pressure in the combustion chamber rise, so that self-ignition of fuel occurs, and at least a portion of the main injected fuel is burned by diffusion combustion. Only a part of the pre-injected fuel is burned by ignition by the ignition plug. The other part of the pre-injected fuel than the part burned by propagation of flame generated by the ignition is burned by self-ignition or diffusion combustion after the start of the main injection. Consequently, the pre-injected fuel and the main injected fuel both contribute to the power of the internal combustion engine. Therefore, diesel combustion having high thermal efficiency can be brought about.

As described above, the pre-combustion is combustion caused through propagation of flame. The main injection is performed while the flame is thus propagating, so that combustion of the main injected fuel is started by the flame. However, in a partial region around the fuel injection valve, the air-fuel ratio may become so high in some cases, due to diffusion of the pre-injected fuel away from that region before arrival of the propagating flame generated in the proximity of the ignition plug by ignition of the pre-injected fuel, that it is difficult for the fuel to burn. Flame cannot propagate in such a region in which the air-fuel ratio is high. In consequence, there will be a local region around the fuel injection valve in which flame is not generated in the pre-combustion. In the following, such a region will be referred to as "flame ungenerated region".

In the apparatus according to an embodiment of the present invention, fuel is injected by the fuel injection valve radially from a location near the center of the combustion chamber. Therefore, in the case where there is a flame ungenerated region in the pre-combustion, when the main injection is performed by the fuel injection valve, the main injected fuel is supplied also to the flame ungenerated region. In the flame ungenerated region, the fuel supplied by the main injection (main injected fuel) is less apt to be burned than in the other regions in which flame generated by the pre-combustion is present. Therefore, self-ignition of fuel after the main injection occurs later in the flame ungenerated region than in the other regions. Consequently, in the flame ungenerated region, self-ignition of fuel progresses rapidly or intensely. Such rapid or intense ignition of fuel can be a cause of knocking and/or combustion noise.

In the apparatus according to an embodiment of the present invention, at least in a part of the operation range of the internal combustion engine, the middle injection is performed by the fuel injection valve in addition to the pre-injection and the main injection. The middle injection is carried out by injecting a quantity of fuel smaller than the quantity of fuel injected by the pre-injection in the same combustion cycle by the fuel injection valve at a middle injection time after the ignition of the pre-spray by the ignition plug and before the main injection time. The middle injection time is set in such a way that the middle injected fuel is burned by propagation of flame starting from flame generated by the ignition of the pre-spray. Thus, the middle injected fuel is subjected to the pre-combustion.

When the middle injection is performed at the middle injection time, fuel (middle injected fuel) is additionally supplied to a region that could be a flame ungenerated region if the middle injection were not performed, prior to the main injection time. Consequently, the air-fuel ratio in that region decreases to a level that allows combustion of fuel. In consequence, the flame generated by the pre-combustion can propagate to that region. Consequently, flame is generated in that region also. Thus, the region around the fuel injection valve in which flame is present at the time when the main fuel injection is started is extended by combustion of middle injected fuel caused through propagation of flame.

As described above, performing the middle injection can reduce or eliminate the flame ungenerated region. The middle injected fuel quantity is smaller than the pre-injected fuel quantity in the same combustion cycle. Therefore, even when the middle injection is performed, the occurrence of self-ignition of fuel before the main injection time can be prevented as reliably as possible.

As per the above, embodiments of the present invention can prevent the occurrence of rapid or intense self-ignition of fuel. Therefore, it can prevent or reduce knocking or combustion noise.

The higher the engine load of the internal combustion engine is, the higher the pressure and the temperature in the cylinder tend to be. Therefore, when there is a flame ungenerated region in pre-combustion, the higher the engine load of the internal combustion engine is, the more likely rapid or intense self-ignition of fuel is to occur when the main injection is performed. Therefore, in the apparatus according to embodiments of the present invention, the part of the operation range in which the middle injection is performed may be an operation range in which the engine load of the internal combustion engine is higher than a predetermined load. Then, the controller may perform the pre-injection and the main injection in one combustion cycle in the operation range in which the engine load of the internal combustion engine is lower than or equal to the predetermined load and perform the middle injection in addition to the pre-injection and the main injection in one combustion cycle in the operation range in which the engine load of the internal combustion engine is higher than the predetermined load. With this mode, diesel combustion with high thermal efficiency can be brought about while preventing rapid or intense self-ignition of fuel as reliably as possible in the operation range in which the engine load of the internal combustion engine is high.

In the apparatus according to embodiments of the present invention, the middle injected fuel quantity may be set smaller than the smallest pre-injected fuel quantity in the entire operation range in which the pre-injection is performed. With this mode, even when the middle injection is performed, the occurrence of self-ignition of fuel before the main injection time can be prevented with higher probability.

In the apparatus according to embodiments of the present invention, the quantity of fuel injected by the middle injection may be set smaller than the smallest fuel injection quantity with which self-ignition of fuel will occur in a period after the middle injection is performed and before the main injection time. This smallest fuel injection quantity is calculated using the Livengood-Wu integral equation based on the quantity of air in the cylinder, the pressure in the cylinder, and the temperature in the cylinder at the middle injection time.

Potentially Advantageous Effects of Invention

Embodiments of the present invention can prevent the occurrence of rapid or intense self-ignition of fuel in an internal combustion engine that performs diesel combustion using a fuel having a relatively high self-ignition temperature, such as gasoline.

BRIEF DESCRIPTION OF THE DRAWINGS

FIGS. 3A and 3B are diagrams illustrating basic combustion control performed in the example of the present invention.

FIGS. 9A, 9B, 9C, 9D, 9E, and 9F shows states of fuel and flame in a cylinder in a case where the high load combustion control according to the example of the present invention is performed.

DESCRIPTION OF EMBODIMENTS

In the following, specific embodiments of the present invention will be described with reference to the drawings. The dimensions, materials, shapes, relative arrangements, and other features of the components that will be described in connection with the embodiments are not intended to limit the technical scope of the present invention only to them, unless particularly stated.

Example 1

Figure 1:
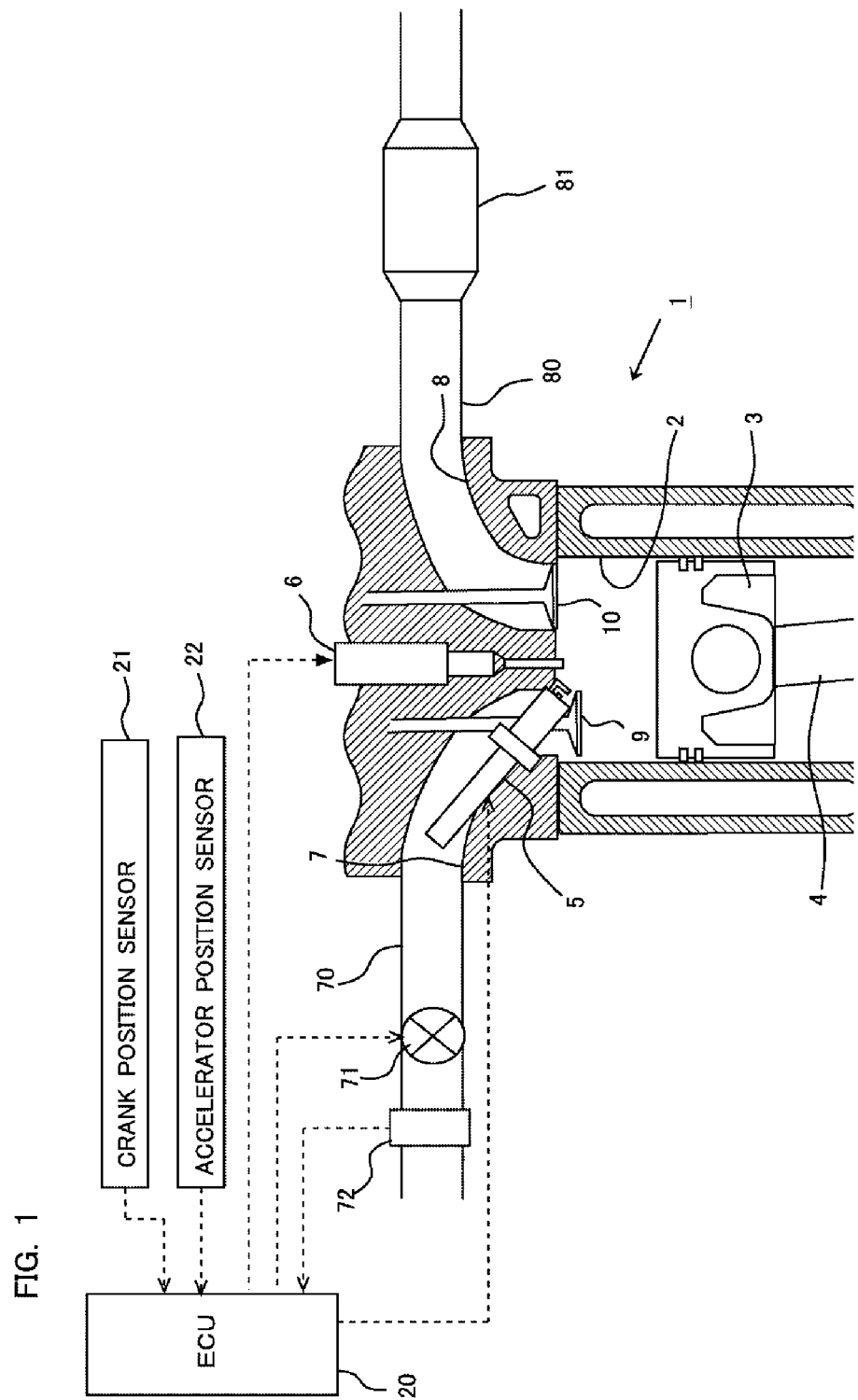
FIG. 1 is a diagram showing the general configuration of the air-intake and exhaust systems of an internal combustion engine to which an example of the present invention is applied.

FIG. 1 is a diagram showing the general configuration of the air-intake and exhaust systems of an internal combustion engine to which an embodiment of the present invention is applied.

The internal combustion engine 1 shown in FIG. 1 is a four-stroke-cycle, spark-ignition internal combustion engine (gasoline engine) having a plurality of cylinders. In FIG. 1, only one of the plurality of cylinders is illustrated. The internal combustion engine 1 is designed in such a way that a swirling flow is generated in each cylinder 2.

In each cylinder 2 of the internal combustion engine 1, a piston 3 is provided in a slidable manner. The piston 3 is linked with an output shaft (crankshaft), which is not shown in the drawings, by a connecting rod 4. The interior of the cylinder 2 is in communication with intake ports 7 and exhaust ports 8. An end of the intake port 7 opening into the cylinder 2 is opened/closed by an intake valve 9. An end of the exhaust port 8 opening into the cylinder 2 is opened/closed by an exhaust valve 10. The intake valve 9 and the exhaust valve 10 are driven to be opened/closed respectively by an intake cam and an exhaust cam not shown in the drawings.

Each cylinder 2 is provided with a fuel injection valve 6 and an ignition plug 5. The fuel injection valve 6 is provided on top of the central portion of the combustion chamber in the cylinder 2 and injects fuel directly into the cylinder. The ignition plug 5 ignites fuel (fuel spray or air-fuel mixture) in the combustion chamber of the cylinder 2.

Figure 2:
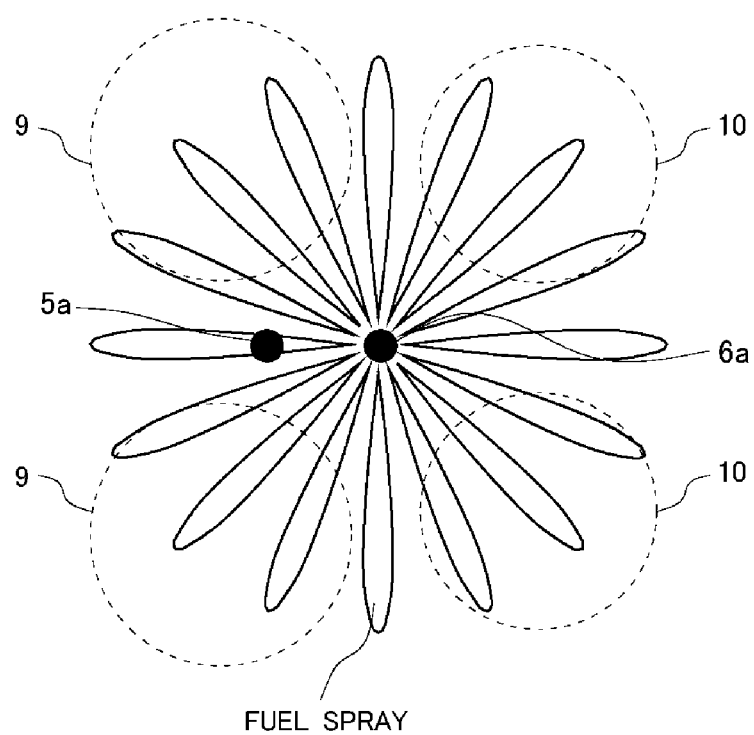
FIG. 2 is a diagram illustrating the arrangement of an ignition plug with which the internal combustion engine shown in FIG. 1 is equipped.

Now we will describe the arrangement of the ignition plug 5 in the cylinder 2 with reference to FIG. 2. The fuel injection valve 6 in this example has an injection port 6a with which fuel can be injected nearly radially in (sixteen) directions as shown in FIG. 2. The position of the ignition plug 5 relative to the fuel injection valve 6 is arranged in such a way that at least one of the fuel sprays injected from the injection port 6a passes through a region 5a between the electrodes or the ignition-capable region of ignition plug 5 and that the fuel spray thus passing through the region 5a can be directly ignited by a spark generated between the electrodes in the region 5a. The ignition plug 5 and the fuel injection valve 6 arranged as above can bring about spray guide combustion. In other words, the fuel injection valve 6 and the ignition plug 5 are capable of igniting the fuel spray passing through the region 5a at any desired time regardless of the opening timing of the intake valves 9 of the internal combustion engine 1 or the position of the piston 3. In this example, the ignition plug 5 is located between the openings of the two intake ports 7 so that it does not interfere with the operations of the intake valves 9 and the exhaust valves 10. The location of the ignition plug in the apparatus according to an embodiment of the present invention is not limited to a position between the openings of the two intake ports. In this example, as shown in FIG. 2, the internal combustion engine is designed in such a way that one of fuel sprays injected from the injection port 6a falls on the electrodes of the ignition plug 5. However, the ignition-capable region of the ignition plug 5 is not limited to the region 5a between the electrodes but includes a region around the electrodes also. Therefore, it is not necessarily required that a fuel spray injected from the injection port 6a fall on the electrodes of the ignition plug 5. In other words, it is not necessarily required that the ignition plug 5a be located in line with the direction of fuel injection from the injection port 6a (namely, on the center axis of the fuel spray). Even in the case where the fuel spray injected from the injection port 6a is offset from the electrodes of the ignition plug 5, spray guide combustion started by a spark generated between the electrodes of the ignition plug 5 can be brought about, so long as the fuel spray passes the ignition-capable region. Thus, in this example, what is required is that the position of the ignition plug 5 relative to the fuel injection valve 6 be arranged in such a way as to be capable of bringing about spray guide combustion. Therefore, the ignition plug 5 may be offset from the direction of fuel injection (namely, the center axis of the fuel spray) from the injection port 6a.

Returning back to FIG. 1, the intake port 7 is in communication with an intake passage 70. The intake passage 70 is provided with a throttle valve 71. An air flow meter 72 is provided in the intake passage 70 upstream of the throttle valve 71. On the other hand, the exhaust port 8 is in communication with an exhaust passage 80. An exhaust gas purification catalyst 81 for purifying the exhaust gas discharged from the internal combustion engine is provided in the exhaust passage 80. As will be described later, the exhaust gas discharged from the internal combustion engine 1 has a lean air-fuel ratio higher than the stoichiometric air-fuel ratio, and a selective catalytic reduction NOx catalyst capable of removing NOx in the exhaust gas having such a lean air-fuel ratio and a filter capable of trapping particulate matter (PM) in the exhaust gas may be employed as the exhaust gas purification catalyst 81.

Moreover, an electronic control unit (ECU) 20 is annexed to the internal combustion engine 1. The ECU 20 is a unit that controls the operation state of the internal combustion engine 1 and the exhaust gas purification apparatus etc. The ECU 20 is electrically connected with the aforementioned air flow meter 72, a crank position sensor 21, and an accelerator position sensor 22, and measurement values of the sensors are input to the ECU 20. Thus, the ECU 20 can recognize the operation state of the internal combustion engine 1, such as the intake air quantity based on the measurement value of the air flow meter 72, the engine speed calculated based on the measurement value of the crank position sensor 21, and the engine load calculated based on the measurement value of the accelerator position sensor 22. The ECU 20 is also electrically connected with the fuel injection valve 6, the ignition plug 5, and the throttle valve 71 etc. These components are controlled by the ECU 20.

<Basic Combustion Control>

Basic combustion control performed in the internal combustion engine 1 having the above-described configuration will now be described with reference to FIGS. 3A and 3B. FIG. 3A schematically illustrates a procedure of fuel injection and ignition in the basic combustion control performed in the internal combustion engine 1 in time sequence from left to right of the diagram (see upper row of FIG. 3A) and phenomena relating to combustion which are considered to occur in succession in the combustion chamber as results of the fuel injection and ignition (see the lower row of FIG. 3A). FIG. 3B shows relationship between pre-injection and main injection, which are included in the fuel injections shown in FIG. 3A, and ignition in time line. The mode shown in FIGS. 3A and 3B are given only as schematics illustration of the basic combustion control performed in this example, and the present invention should not be considered to be limited to this mode.

In the basic combustion control of this example, pre-injection and main injection are performed by the fuel injection valve 6 in one combustion cycle. The pre-injection is fuel injection performed during the compression stroke. The main injection is fuel injection started at a time after the pre-injection and before the top dead center (TDC) of the compression stroke. Although the main injection is started at a time before the top dead center, it may continue past the top dead center. As shown in FIG. 3B, the time of starting the pre-injection (which will be simply referred to as the "pre-injection time" hereinafter) is denoted by Tp, and the time of starting the main injection (which will be simply referred to as the "main injection time" hereinafter) is denoted by Tm. The interval between the pre-injection time and the main injection time (Tm−Tp) is defined as a first injection interval Di1. Combustion with the pre-injection is performed as the above-described spray guide combustion. That is to say, pre-spray of the fuel injected by the pre-injection (which will be hereinafter referred to as "pre-injected fuel") is ignited by the ignition plug 5. The time of this ignition is denoted by Ts as shown in FIG. 3B, and the interval from the start of the pre-injection to the time of ignition (Ts−Tp) is defined as the ignition interval Ds.

In the following, the procedure of the basic combustion control according to the present invention will be described.

(1) Pre-Injection

In the basic combustion control, in one combustion cycle, the pre-injection is firstly performed at the pre-injection time Tp during the compression stroke. The pre-injection time Tp is determined in relation to the main injection time Tm. This relationship will be described later. As the pre-injection is performed, the pre-spray of the pre-injected fuel injected through the fuel injection valve 6 passes through the ignition-capable region 5a of the ignition plug 5 in the combustion chamber, as shown in FIG. 2. Since the penetration of the pre-spray is low, it is not diffused extensively in the combustion chamber. Consequently, immediately after the pre-injection, the pre-spray of the pre-injected fuel creates a stratified air-fuel mixture in the combustion chamber.

(2) Ignition of Pre-Injected Fuel

The pre-spray is ignited by the ignition plug 5 at the ignition time Ts after the predetermined ignition interval Ds from the pre-injection time. As described above, at the time immediately after the pre-injection, the pre-injected fuel is stratified. Therefore, even though the pre-injected fuel quantity is small, the local air-fuel ratio around the ignition plug 5 is at a level allowing combustion by this ignition. By this ignition, the pre-injected fuel is burned by propagation of flame. Thus, spray guide combustion with the pre-injected fuel is brought about. In other words, the ignition interval Ds is set in such a way that the spray guide combustion can be brought about. (The spray guide combustion with the pre-injected fuel will be referred to as the "pre-combustion" hereinafter.) In addition to a pressure rise caused by the effect of compression by the piston 3, a temperature rise is caused in the combustion chamber by the pre-combustion. However, the fuel burned by the pre-combustion is only a part of the pre-injected fuel, and a large part of the pre-injected fuel is not burned in the combustion caused by the propagation of flame generated by the ignition but remains in the combustion chamber as "unburned residual fuel" after the ignition. This is because the air-fuel ratio of the stratified air-fuel mixture formed by the pre-injected fuel is so high in regions relatively distant from the inter-electrode region of the ignition plug 5 that flame cannot propagate in such regions. However, the unburned residual fuel is exposed to a high-temperature atmosphere resulting from the combustion of a portion of the pre-injected fuel in the combustion chamber. Therefore, it is expected that at least a portion of the unburned residual fuel is reformed in its properties to have improved combustibility, by virtue of low temperature oxidation occurring under a condition that does not cause it to be burned. It should be noted, however, that embodiments of in the context of the present invention, the unburned residue of the pre-injected fuel refers to a portion of the pre-injected fuel that remains in the combustion chamber in an unburned state without having been burned in the combustion caused by propagation of flame generated by the ignition, and it is not essential for the unburned residual fuel to be in a condition showing specific properties.

(3) Main Injection

The main injection through the fuel injection valve 6 is started at the main injection time Tm after the first injection interval Di1 from the pre-injection time and before the top dead center of the compression stroke (in other words, at time Tm after the lapse of time equal to Di1−Ds from the time of ignition Ts by the ignition plug 5). In this internal combustion engine 1, the main injected fuel is burned by self-ignition or diffusion combustion to contribute to the engine power as will be described later. Therefore, the main injection time Tm is set to such a time that nearly maximizes the engine power attained by combustion of a quantity of main injected fuel determined by the engine load and other factors. (This injection time will be hereinafter referred to as "proper injection time"). Combustion of the main injected fuel is started by flame generated by the ignition of the pre-spray as the ignition source. In other words, the first injection interval Di1 is set in such a way that the main injection time Tm is set to the proper injection time and that combustion of the main injected fuel is started by flame generated by the ignition of the pre-spray. Since the main injection time Tm and the first injection interval Di1 are set in this way, the pre-injection time Tp is necessarily determined. After the combustion of the main injected fuel starts, the temperature in the combustion chamber rises further. Consequently, the unburned residue of the pre-injected fuel and the main injected fuel self-ignite in the raised temperature field and are burned by diffusion combustion. In connection with this, in cases where the combustibility of the unburned residue of the pre-injected fuel has been enhanced as described above, the self-ignition of fuel after the start of the main injection is expected to be further promoted.

Figure 4:
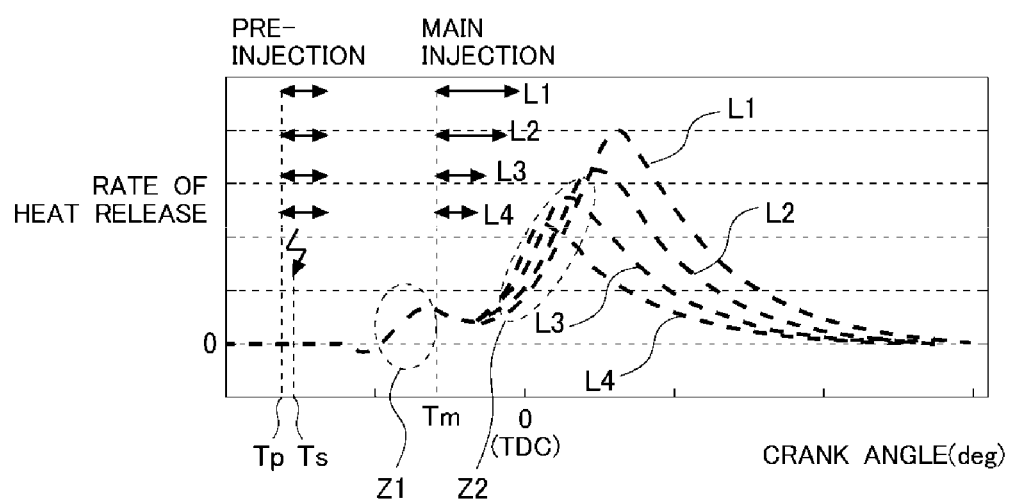
FIG. 4 is a graph showing the change in the rate of heat release in the combustion chamber in a case where the basic combustion control according to the example of the present invention is performed.

FIG. 4 shows the changes of rate of heat release in the combustion chamber in a case where the basic combustion control according to this example is performed. FIG. 4 shows the changes of the rate of heat release corresponding to four different control modes L1 to L4. In these control modes L1 to L4, while the pre-injection time Tp, the pre-injected fuel quantity (i.e. the duration of the pre-injection), the main injection time Tm, and the ignition time Ts are the same among the control modes, the main injected fuel quantity (i.e. the duration of the main injection) is varied among the control modes. Specifically, the main injected fuel quantity is varied like L1>L2>L3>L4. Therefore, FIG. 4 shows variation of the change of the rate of heat release resulting from variation in the main injected fuel quantity in the case where the pre-injection time Tp, the pre-injected fuel quantity, the main injection time Tm, and the ignition time Ts are fixed.

Figure 5:
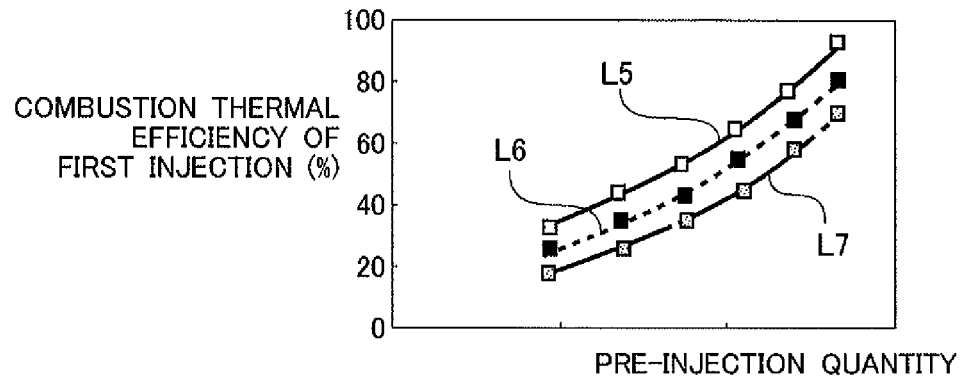
FIG. 5 is a graph showing relationship between the pre-injected fuel quantity and the combustion efficiency of the pre-injected fuel in a case where the pre-injection is performed in the basic combustion control according to the example of the present invention.

In FIG. 4, the rate of heat release shows a first peak in a portion Z1 encircled by a broken line. This first peak indicates heat generated by the combustion of the pre-injected fuel started by ignition (that is, heat generated by the pre-combustion). At the time at which the rate of heat release shows the first peak, the main injection has not been performed yet, and flame generated by ignition of the pre-injected fuel and the unburned residual fuel, which is the portion of the pre-injected fuel that has not been burned by the ignition, are present in the combustion chamber. Now, the unburned residue of the pre-injected fuel will be discussed with reference to FIG. 5. FIG. 5 shows correlation of the pre-injected fuel quantity and the combustion efficiency of the pre-injected fuel (which will be hereinafter referred to as the "pre-combustion efficiency") for three combustion conditions L5 to L7, in the case where the pre-injection is performed according to the basic combustion control. Specifically, the pre-injection time Tp and the ignition time Ts, which are the combustion conditions, are advanced in the order of L5, L6, and L7, while the ignition interval Ds or the interval between time Tp and time Ts is fixed. FIG. 5 shows the above-described correlation in the case where only the pre-injection and ignition are performed but the main injection is not performed (namely, in the case where only the spray guide combustion is performed).

The pre-combustion efficiency and the unburned residue rate of the pre-injected fuel are in a relationship expressed by the following equation 1. Specifically, the higher the pre-combustion efficiency is, the lower the unburned residue rate is.

$$\text{(unburned residue rate of pre-injected fuel)}=1-\text{(pre-combustion efficiency)} \quad \text{(equation 1)}$$

Referring to FIG. 5, if the pre-injection time Tp and the ignition time Ts are advanced (namely, if the first injection interval Di1 is increased) while the pre-injected fuel quantity is fixed, the pre-combustion efficiency tends to decrease, and the unburned residue rate tends to increase consequently. Even if the pre-injected fuel quantity is changed, it is possible to keep the pre-combustion efficiency and the unburned residue rate constant by adjusting the degree of advancement of the pre-injection time Tp and the ignition time Ts. As described above, the combustion control according to this example can control the unburned residue rate of the pre-injected fuel by controlling the pre-injected fuel quantity and the degree of advancement of the pre-injection time Tp and the ignition time Ts (i.e. the first injection interval Di1).

Referring back to FIG. 4, the main injection is started at time Tm after the time at which the rate of heat release shows the first peak and before the top dead center of the compression stroke. Then, as described before, the main injected fuel is started burning by flame generated by the pre-combustion, thereafter self-ignites together with the unburned residue of the pre-injected fuel, and burns by diffusion combustion. Consequently, a second peak, which is the highest peak, of the rate of heat release occurs at a time after the top dead center of the compression stroke. In the case shown in FIG. 4, as the main injected fuel quantity increases (namely as the duration of the main injection increases), the value of the second peak of the rate of heat release increases, and the time at which the second peak occurs becomes later. This means that as the main injected fuel quantity increases, the duration of the combustion of the main injected fuel increases. It is conjectured from this that the main injected fuel and the unburned residue of the pre-injected fuel are subjected to diffusion combustion.

Figure 6:
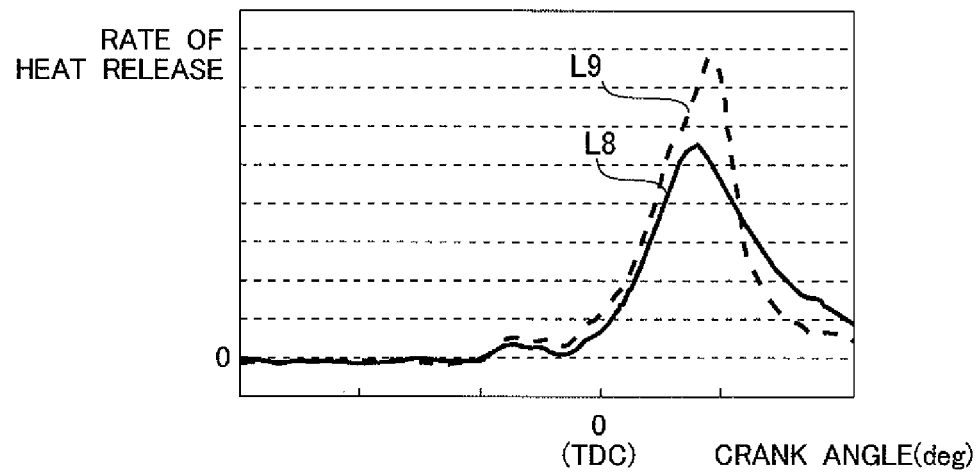
FIG. 6 shows the change of the rate of heat release in the combustion chamber for different modes between which the ratio of the pre-injected fuel quantity and the main injected fuel quantity is different in the basic combustion control according to the example of the present invention.

Self-ignition of fuel occurring in the basic combustion control according to this example will be described with reference to FIG. 6. FIG. 6 shows the change of the rate of heat release in the combustion chamber for two modes L8 and L9 of the basic combustion control according to this example between which the ratio of the pre-injected fuel quantity and the main injected fuel quantity is different, while the total injection quantity (i.e. the sum of the pre-injected fuel quantity and the main injected fuel quantity) in one combustion cycle is kept constant. The proportion of the pre-injected fuel quantity is larger in mode L9 than in mode L8. In other words, the pre-injected fuel quantity is larger and consequently the quantity of the unburned residue of the pre-injected fuel is also larger in mode L9 than in mode L8. As will be seen in FIG. 6, the value of the second peak of the rate of heat release occurring after the top dead center of the compression stroke is higher in mode L9 than in mode L8. Moreover, the falling rate from the second peak value of the rate of heat release (or the inclination of the curve in the graph after the second peak) is higher in mode L9 than in mode L8. It is conjectured that the above facts suggest that after the start of the main injection, combustion of the unburned residue of the pre-injected fuel and the main injected fuel by self-ignition is more promoted (namely the proportion of fuel burned by self-ignition is larger, and the proportion of fuel burned by diffusion combustion is smaller) in mode L9 than in mode L8. It is considered from this that the unburned residue of the pre-injected fuel contributes to the promotion of self-ignition of fuel after the main injection. The inventor of the present invention verified that in the basic combustion control of this example, the self-ignition of fuel after the main injection is promoted also in the case where the quantity of the unburned residue of the pre-injected fuel is increased by controlling the pre-injection time Tp and the ignition time Ts as well as the pre-injected fuel quantity. To sum up, in the basic combustion control according to this example, it is possible to promote self-ignition in burning unburned residue of the pre-injected fuel and the main injected fuel after the start of the main injection by controlling parameters relating to the pre-injection and the ignition to increase the unburned residue rate of the pre-injected fuel.

As described above, in the basic combustion control according to this example, self-ignition and diffusion combustion of fuel is caused to occur by performing the main injection after the spray guide combustion brought about by the pre-injection and the ignition by the ignition plug 5. Therefore, the combustion brought about by the basic combustion control is similar to what is called diesel combustion. Consequently, the air-fuel ratio of the air-fuel mixture in the combustion chamber is allowed to be very high or lean (in the range between approximately 20 and 70). To bring about combustion at such a lean air-fuel ratio, in the combustion control according to this example, the throttle valve 71 is opened to a degree larger than in the case of conventional combustion control (homogeneous stoichiometry control) for gasoline engines. Consequently, the pump loss in the internal combustion engine 1 can be made smaller. Moreover, since the combustion that contributes to the engine power is brought about by self-ignition and diffusion combustion, the cooling loss in the internal combustion engine 1 can also be made smaller than in the case of the conventional homogeneous stoichiometry control. In consequence, the basic combustion control according to this example can attain high thermal efficiency that cannot be attained by conventional combustion control for gasoline engines.

The pre-injection is performed at the pre-injection time Tp during the compression stroke. Therefore, combustion of the pre-injected fuel ignited by the ignition plug 5 may be considered to be counteractive to the engine power of the internal combustion engine 1. However, what is required in the combustion of the pre-spray of the pre-injected fuel caused by ignition is only to generate flame serving as an ignition source for combustion of the main injected fuel. Therefore, the fuel burned in the combustion caused by propagation of flame generated by the ignition is only a portion of the pre-injected fuel. Consequently, the effect of the spray guide combustion of the pre-injected fuel counteractive to the engine power is small. The unburned residue of the pre-injected fuel that has not been burned in the spray guide combustion is burned by self-ignition or diffusion combustion together with the main injected fuel after the main injection to contribute to the engine power. Therefore, an increase in the fuel quantity required by an increase in the engine load can be provided also by increasing the pre-injected fuel quantity and increasing its unburned residue rate.

As described above, the main injection time is set to the proper injection time that nearly maximizes the engine power of the internal combustion engine 1. Therefore, an increase in the fuel quantity required by an increase in the engine load can be attained up to some extent by increasing the main injected fuel quantity. However, since the main injection is performed at a time near the top dead center of the compression stroke, at which the pressure in the combustion chamber is very high, the penetration of the fuel spray injected by the fuel injection valve 6 is low. In other words, the fuel spray injected by the main injection is not apt to diffuse extensively. For this reason, if the main injected fuel quantity is increased too much, the quantity of oxygen existing around the spray of the main injected fuel or the quantity of oxygen available for combustion of the main injected fuel becomes deficient relative to the quantity of fuel, possibly leading to an increase in the amount of smoke generated. Furthermore, in the basic combustion control according to this example, it is necessary that self-ignition of fuel occur after the main injection. If the main injected fuel quantity is excessively large, there is a possibility that the temperature in the combustion chamber may be lowered by the evaporation latent heat of the main injected fuel to make the combustion unstable. At the main injection time, the unburned residue of the pre-injected fuel is diffused in the combustion chamber more extensively than the main injected fuel. In consequence, a sufficient quantity of oxygen is likely to be available for self-ignition or diffusion combustion of the unburned reside of the pre-injected fuel. Therefore, in the case where the pre-injected fuel quantity and the unburned residue rate thereof are increased in response to an increase in the engine load, the amount of smoke generated can be made smaller than in the case where the main injected fuel quantity is increased.

<Flame Ungenerated Region>

Figure 7:
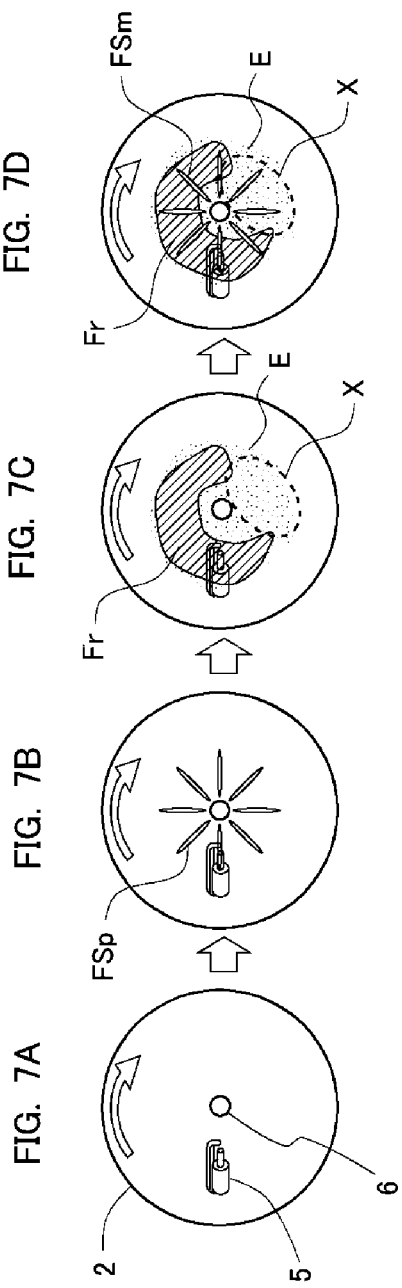
FIGS. 7A, 7B, 7C, and 7D show states of fuel and flame in a cylinder in a case where the basic combustion control according to the example of the present invention is performed.

The state of fuel and flame in the cylinder in the case where the above-described basic combustion control is performed will be described with reference to FIGS. 7A, 7B, 7C, and 7D. In FIGS. 7A, 7B, 7C, and 7D, the state in the cylinder changes with time in the order of FIG. 7A, FIG. 7B, FIG. 7C, and FIG. 7D. In FIG. 7B, the pre-spray FSp is illustrated. In FIG. 7D, the fuel spray FSm formed by the main injection (which will be sometimes referred to as the "main spray" hereinafter) is illustrated. In FIGS. 7C and 7D, moreover, fuel E (including the unburned residual fuel) present around the fuel injection valve 6 after fuel injection and flame Fr generated by the pre-combustion are also illustrated. As shown in FIG. 2, fuel is ejected from the fuel injection valve 6 in sixteen directions. For the sake of simplicity, only eight fuel sprays ejected from the fuel injection valve 6 are illustrated in FIGS. 7B and 7D. In FIGS. 7A, 7B, 7C, and 7D, the hollow arrow indicates the direction of a swirl flow in the cylinder 2.

In the internal combustion engine 1, when the pre-injection is performed by the fuel injection valve 6 at the pre-injection time, one of the pre-sprays FSp passes through the ignition-capable region of the ignition plug 5 as shown in FIG. 7B. Then, the pre-spray FSp is ignited by the ignition plug 5 to burn, whereby flame Fr is generated in the neighborhood of the ignition plug 5. The flame Fr thus generated propagates in the region around the fuel injection valve 6. At that time, there is a swirl flow in the cylinder 2, and the flame Fr propagates mainly in the direction of the flow of the swirl as shown in FIG. 7C. If the main injection is performed by the fuel injection valve 6 at the main injection time while the flame is propagating, the main injected fuel is supplied to the flame Fr as shown in FIG. 7D. Consequently, combustion of the main injected fuel is started by the flame Fr, and thereafter self-ignition and diffusion combustion of fuel occurs.

As described before, at the time immediately after the pre-injection, the pre-injected fuel is stratified in the region around the fuel injection valve 6. However, after the pre-injection, the pre-injected fuel injected by the fuel injection valve 6 is gradually diffused extensively as time passes. Therefore, in a partial region around the fuel injection valve 6, the air-fuel ratio may become so high, due to the diffusion of the pre-injected fuel away from that region before arrival of the propagating flame Fr, that it is difficult for the fuel to burn. Consequently, in some cases, there may be a partial region (the region X encircled by broken line in FIG. 7C) in the combustion chamber in which flame is not generated in the pre-combustion. (Such a region will be hereinafter referred to as "flame ungenerated region".)

In the case where there is a flame ungenerated region X as described above, when the main injection by the fuel injection valve 6 is performed, the main injected fuel is supplied also to the flame ungenerated region X as shown in FIG. 7D. As described above, combustion of the main injected fuel injected toward the flame Fr is started by the flame Fr. In the flame ungenerated region X, there is no flame Fr by which combustion of the main injected fuel is to be started. Therefore, in the flame ungenerated region X, it is less likely for the supplied main injected fuel to burn than in the other regions in the combustion chamber in which the flame Fr is present at the main injection time. Nevertheless, if the temperature and the pressure in the combustion chamber are increased by combustion of the main injected fuel supplied to regions other than the flame ungenerated region X, the main injected fuel supplied to the flame ungenerated region X also self-ignites. In this case, however, self-ignition of fuel after the main injection occurs later in the flame ungenerated region X than in the other regions. In other words, the duration of delay in the self-ignition of fuel is longer in the flame ungenerated region X. Consequently, the self-ignition of fuel occurring in the flame ungenerated region X is more rapid or intense than the self-ignition occurring in the other regions. Such rapid or intense self-ignition of fuel can be a cause of knocking and combustion noise.

<High Load Combustion Control>

Figure 8:
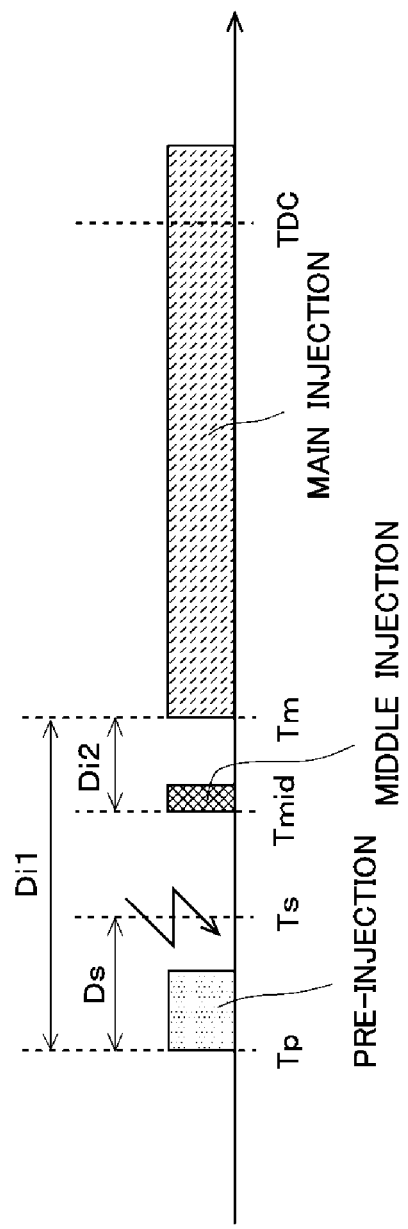
FIG. 8 is a diagram illustrating high load combustion control performed in the example of the present invention.

When the engine load of the internal combustion engine 1 is high, the pressure and the temperature in the cylinder 2 tends to be high. For this reason, if there is a flame ungenerated region in the pre-combustion, rapid or intense self-ignition of fuel is likely to occur when the main injection is performed. In this example, in an operation range in which the engine load of the internal combustion engine 1 is higher than a predetermined load, high load combustion control is performed instead of the above-described basic combustion control in order to prevent the occurrence of rapid or intense self-ignition of fuel. In the following, the high load combustion control according to this example will be described with reference to FIG. 8. FIG. 8 shows a temporal relationship of fuel injections and ignition performed in the high load combustion control in time sequence from left to right.

In the high load combustion control, middle injection is performed by the fuel injection valve 6 in addition to the pre-injection and the main injection in one combustion cycle. As shown in FIG. 8, the middle injection is performed at a middle injection time Tmid after the ignition of the pre-spray by the ignition plug 5 and prior to the main injection time Tm. The interval between the middle injection time Tmid and the main injection time Tm (Tm−Tmid) is defined as the second injection interval Di2. In the high load combustion control also, the main injection time Tm is set to the proper injection time, as in the basic combustion control. The second injection interval Di2 is set in such a way that the fuel injected by the middle injection (which will be hereinafter referred to as the "middle injected fuel") is burned by propagation of flame starting from the flame Fr generated by the ignition of the pre-spray. Thus, the middle injected fuel is subjected to the pre-combustion.

In the high load combustion control also, the ignition interval Ds, which is the interval between the pre-injection time and the ignition time (Ts−Tp), is set in such a way as to enable spray guide combustion with the pre-injected fuel, as in the basic combustion control. In the high load combustion control also, the first injection interval Di1, which is the interval between the pre-injection time and the main injection time (Tm−Tp), is set in such a way that combustion of the main injected fuel is started by flame generated by ignition of the pre-spray, as in the basic combustion control.

The state of fuel and flame in the cylinder in the case where the above-described high load combustion control is performed will be described with reference to FIGS. 9A, 9B, 9C, 9D, 9E, and 9F. In FIGS. 9A, 9B, 9C, 9D, 9E, and 9F, the state in the cylinder changes with time in the order of FIG. 9A, FIG. 9B, FIG. 9C, FIG. 9D, FIG. 9E, and FIG. 9F. In FIG. 9B, the pre-spray FSp is illustrated, as in FIG. 7B. In FIG. 9F, the main spray Fsm is illustrated, as in FIG. 7D. Moreover, in FIG. 9D, the fuel spray FSmid formed by the middle injection (which will be sometimes referred to as the "middle spray" hereinafter) is also illustrated. In FIGS. 9C, 9D, 9E, and 9F, fuel E present around the fuel injection valve 6 after fuel injection and flame Fr generated by the pre-combustion are also illustrated, as in FIGS. 7C and 7D. In FIGS. 9B, 9D, and 9F also, only eight fuel sprays ejected from the fuel injection valve 6 are illustrated for the sake of simplicity. In FIGS. 9A, 9B, 9C, 9D, 9E, and 9F also, the hollow allow indicates the direction of a swirl flow in the cylinder 2.

As with FIG. 7B, FIG. 9B shows the state at the time when the pre-injection is performed by the fuel injection valve 6 at the pre-injection time. As with FIG. 7C, FIG. 9C shows the propagation of flame Fr generated by combustion of the pre-injected fuel around the fuel injection valve 6. When the middle injection is performed by the fuel injection valve 6 at the middle injection time prior to the main injection time while the flame is propagating, fuel (middle injected fuel) is additionally supplied to region X' that could be a flame ungenerated region if the middle injection were not performed as shown in FIG. 9D. Consequently, the air-fuel ratio in the region X' becomes lower than that in the case where the middle injection was not performed at the middle injection time. More specifically, the air-fuel ratio in the region X' decreases to a level that allows combustion of fuel. In consequence, the flame Fr generated by the pre-combustion can propagate to the region X'. Consequently, the flame Fr is generated in the region X' also, as shown in FIG. 9E. Thus, the region around the fuel injection valve 6 in which the flame Fr is present at the time when the main fuel injection is started is extended.

As above, when the middle injection is performed, the middle injected fuel is subject to the pre-combustion to reduce or eliminate the flame ungenerated region. Consequently, as shown in FIG. 9F, the main injected fuel that would be supplied to the flame ungenerated region if the middle injection were not performed is supplied to the flame Fr. In consequence, combustion of the main injected fuel is started by the flame Fr in the extended region. Thus, delay in the occurrence of self-ignition of fuel after the start of the main injection in a partial region in the combustion chamber can be prevented.

In the middle injection, a quantity of fuel enough to enable generation of flame in the region X' that could be a flame ungenerated region if the middle injection were not performed may be injected. If the middle injected fuel quantity is excessively large, there is a possibility that self-ignition of fuel may occur before the main injection is performed. In this example, the quantity of fuel injected by the middle injection is set to a quantity smaller than the smallest injected fuel quantity in the pre-injection in the entire operation range in which the pre-injection is performed, as will be described later. Thus, self-ignition of fuel can be prevented from occurring before the main injection time.

Therefore, in the high load combustion control according to this example, rapid or intense self-ignition of fuel can be prevented from occurring by performing the middle injection. In consequence, the occurrence of knocking or combustion noise can be prevented.

<Combustion Control Maps>

Figure 10A:
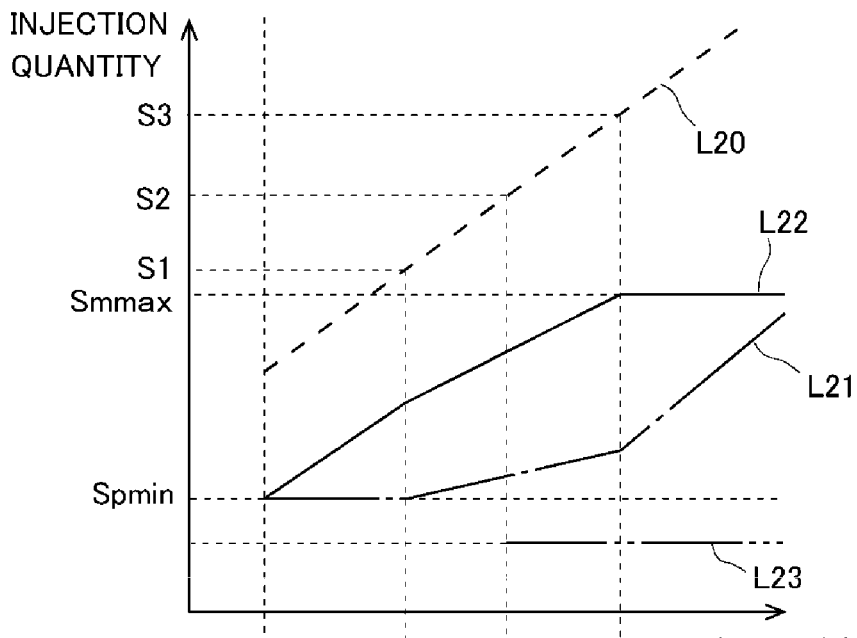
FIGS. 10A and 10B show control maps used in the combustion control according to the example of the present invention.

Control maps used in the combustion control according to this example will be described with reference to FIGS. 10A and 10B. In the graph of FIG. 10A, line L21 represents a relationship between the engine load of the internal combustion engine 1 and the pre-injected fuel quantity, line L22 represents a relationship between the engine load and the main injected fuel quantity, line L23 represents a relationship between the engine load and the middle injected fuel quantity, and line L20 represents a relationship between the engine load and the load-adapted injection quantity, which is the fuel injection quantity adapted to the engine load. In the control maps shown in FIGS. 10A and 10B, the operation range is divided into four operation ranges R1, R2, R3, and R4. The relationship between the engine load in the respective operation ranges is "R1<R2<R3<R4".

In graph of FIG. 10A, S1 is a fuel injection quantity corresponding to the engine load on the border between the operation range R1 (which will be hereinafter referred to as the first load range R1) and the operation range R2 (which will be hereinafter referred to as the second load range R2). This fuel injection quantity S1 will be hereinafter referred to as the first predetermined quantity S1. Furthermore, S2 (>S1) is a fuel injection quantity corresponding to the engine load on the border between the second load range R2 and the operation range R3 (which will be hereinafter referred to as the third load range R3). This fuel injection quantity S2 will be hereinafter referred to as the second predetermined quantity S2. Furthermore, S3 (>S2) is a fuel injection quantity corresponding to the engine load on the border between the third load range R3 and the operation range R4 (which will be hereinafter referred to as the fourth load range R4). This fuel injection quantity S3 will be hereinafter referred to as the third predetermined quantity S3. In this example, when the engine load of the internal combustion engine 1 falls in the first load range R1 or the second load range R2, the above-described basic combustion control is performed. When the engine load falls in the third load range R3 or the fourth load range R4, the above-described high load combustion control is performed. This means that the third load range R3 and the fourth load range R4 are set as the operation range in which there is a high probability that rapid or intense self-ignition of fuel will occur when the main injection is performed, if there is a flame ungenerated region during the pre-combustion. Therefore, in this example, the engine load Qe0 on the border between the second load range R2 and the third load range R3 is the "predetermined load" as defined in embodiments of the present invention.

Figure 10B:
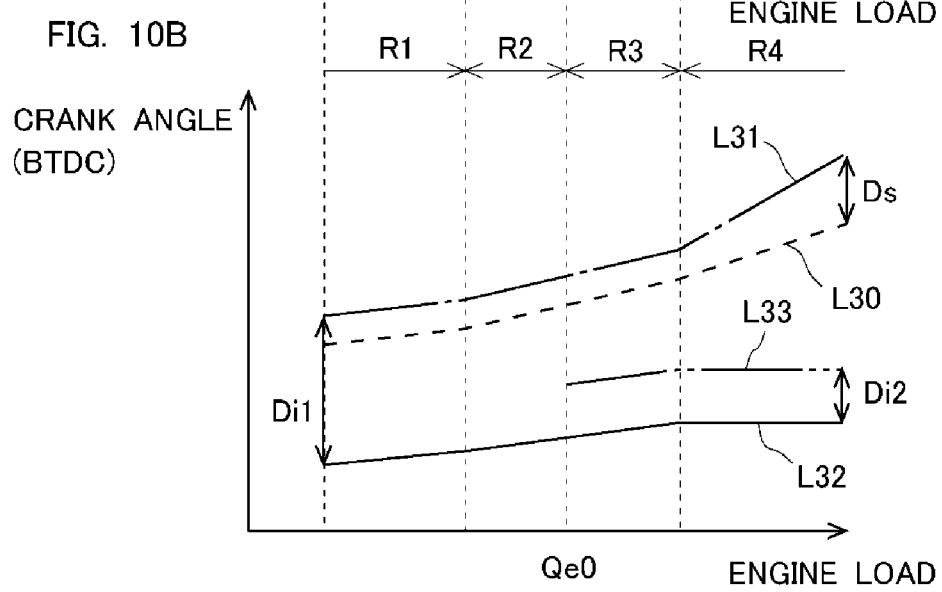

In the graph of FIG. 10B, line L31 represents a relationship between the engine load of the internal combustion engine 1 and the pre-injection time Tp, line L30 represents a relationship between the engine load and the ignition time Ts, line L32 represents a relationship between the engine load and the main injection time Tm, and line L33 represents a relationship between the engine load and the middle injection time Tmid. The distance between line L31 and line L32 represents the first injection interval Di1, the distance between line L31 and line L30 represents the ignition interval Ds, and the distance between line L33 and line L32 represents the second injection interval Di2. The vertical axis of graph of FIG. 10B represents the crank angle (BTDC: Before Top Dead Center) measured from the top dead center of the compression stroke, where larger values represent earlier times during the compression stroke.

Here, the values of the control parameters used to perform the basic combustion control in the first load range R1 and the second load range R2 will be discussed. In the first load range R1, the pre-injected fuel quantity Sp is set to a minimum pre-injected fuel quantity Spmin as shown in graph of FIG. 10A. The minimum pre-injected fuel quantity Spmin is the smallest pre-injected fuel quantity with which flame serving as an ignition source for starting combustion of the main injected fuel when the main injection is performed can be generated. If the pre-injected fuel quantity Sp is large, combustion by ignition by the ignition plug 5 (i.e. spray guide combustion) is facilitated, and therefore the unburned residue rate of the pre-injected fuel may decrease. Setting the pre-injected fuel quantity Sp to the minimum pre-injected fuel quantity Spmin can make the unburned residue rate as high as possible. Therefore, in the first load range R1, the pre-injected fuel quantity Sp is set to the minimum pre-injected fuel quantity Spmin, whereby high thermal efficiency can be achieved while ensuring stable combustion. The first load range R1 is set as an operation range in which the load-adapted injection quantity is relatively small, and even if only the main injected fuel quantity Sm is increased in response to increases in the engine load, it is unlikely that the amount of smoke generated increases or the combustion becomes unstable due to evaporation latent heat of the main injected fuel. Therefore, in the first load range R1, only the main injected fuel quantity Sm is increased in response to increases in the engine load, and the pre-injected fuel quantity Sp is fixed at the minimum pre-injected fuel quantity Spmin as shown in graph of FIG. 10A.

In order to enhance the thermal efficiency of the internal combustion engine 1, the main injection time Tm is set to the proper injection time before the top dead center of the compression stroke. In the first load range R1, moreover, the pre-injection time Tp is set in relation to the main injection time Tm set to the proper injection time in such a way as to set an appropriate first injection interval Di1 with which an appropriate thermal efficiency is attained with the pre-injected fuel quantity Sp set to the minimum pre-injected fuel quantity Spmin. As described above, in the first load range R1, the pre-injected fuel quantity Sp is fixed at the minimum pre-injected fuel quantity Spmin. Consequently, the first injection interval Di1 is also fixed in the first load range R1. Therefore, as shown in graph of FIG. 10B, in the first load range R1, when the main injected fuel quantity Sm is increased in response to an increase in the engine load and the main injection time Tm is advanced accordingly, the pre-injection time Tp is also advanced in accordance with the advancement of the main injection time Tm.

As shown in the graph of FIG. 10B, the ignition interval Ds or the interval between the pre-injection time Tp and the ignition time Ts is kept constant. Therefore, in the first load range R1, when the pre-injection time Tp is advanced in accordance with the advancement of the main injection time Tm, the ignition time Ts is also advanced in accordance with the advancement of the pre-injection time Tp.

In the first load range R1, the relationship between the load-adapted injection quantity S0 and the main injected fuel quantity Sm is expressed by the following equation 2:

$$Sm = S0 - Sp \times \alpha \qquad \text{(Equation 2),}$$

where $\alpha$ is the unburned residue rate of the pre-injected fuel.

As described before, in the basic combustion control according to this example, the unburned residue of the pre-injected fuel is burned by self-ignition or diffusion combustion together with the main injected fuel to contribute to the engine power. Therefore, in terms of contribution to the engine power, the unburned residue of the pre-injected fuel can be regarded to be equivalent to the main injected fuel. Therefore, an appropriate value of the main injected fuel quantity Sm can be determined by determining a factor $\alpha$ representing the unburned residue rate of the pre-injected fuel in advance by an experiment and calculating the main injected fuel quantity Sm according to the above equation 2, which takes into account this factor $\alpha$. The unburned residue rate of the pre-injected fuel changes depending on the ignition interval Ds and the first injection interval Di1. Hence, the value of the factor $\alpha$ depends on them. In the first load range R1, since the ignition interval Ds and the first injection interval Di1 are both constant, the factor $\alpha$ in the above equation 2 is also a constant value. Moreover, in the first load range R1, the pre-injected fuel quantity Sp is fixed at the minimum pre-injected fuel quantity Spmin for the above-described reason, and hence Sp=Spmin in the above equation 2. In cases where the quantity of fuel burned by ignition by the ignition plug 5 (that is, the quantity of fuel burned by the pre-combustion) is very small relative to the pre-injected fuel quantity, the factor $\alpha$ may be set to be equal to 1 in the control process.

The second load range R2 is set as an operation range in which if only the main injected fuel quantity Sm is increased in response to increases in the engine load, there is a high probability that the amount of smoke generated may increase or the combustion may become unstable due to evaporation latent heat of the main injected fuel. Therefore, in the second load range R2, not only the main injected fuel quantity Sm but also the pre-injected fuel quantity Sp is increased in response to increases in the engine load. In consequence, in the second load range R2, the pre-injected fuel quantity Sp is increased with increasing engine load of the internal combustion engine 1, as shown in graph of FIG. 10A. Moreover, in the second load range R2, the pre-injection time Tp is advanced in accordance with the increase in the pre-injected fuel quantity Sp, as will be described later. Consequently, the higher the engine load of the internal combustion engine 1 is, the larger the quantity of the unburned residue of the pre-injected fuel is.

In the second load range R2, the main injected fuel quantity Sm is also increased with increasing engine load of the internal combustion engine 1, as shown by line L22 in graph of FIG. 10A. In the second load range R2 also, as in the first load range R1, the relationship between the load-adapted injection quantity S0 represented by line L20 and the main injected fuel quantity Sm is expressed by equation 2 presented above. As described above, in the second load range R2, the pre-injected fuel quantity Sp is increased with increasing engine load. Therefore, as shown by line L22 in the graph of FIG. 10A, the increase rate of the main injected fuel quantity Sm (which is the rate of the increase in the main injected fuel quantity Sm to the increase in the engine load) in the second load range R2 is lower than the increase rate of the main injected fuel quantity Sm in the first load range R1, in which the pre-injected fuel quantity Sp is fixed. Therefore, it is possible to reduce the increase in the amount of smoke generated due to the increase in the main injected fuel quantity and the occurrence of misfire due to the increase in the evaporation latent heat of the main injected fuel.

In the second load range R2, as shown in graph of FIG. 10B, the pre-injection time Tp is advanced in such a way that the higher the engine load of the internal combustion engine 1 is, the larger the first injection interval Di1 is. Thus, in the second load range R2, the pre-injection time Tp is advanced to a degree larger than the degree of advancement of the main injection time Tm, and the higher the engine load is, the larger the degree of advancement of the pre-injection time Tp is. Controlling the pre-injection time Tp in this way can prevent the concentration of fuel in the region in which the unburned residue of the pre-injected fuel and the main injected fuel overlap from becoming high, even when the quantity of the unburned residue of the pre-injected fuel increases. In consequence, the amount of smoke generated due to the overlapping of the unburned residue of the pre-injected fuel and the main injected fuel can be reduced.

In the second load range R2 also, as in the first load range R1, the ignition interval Ds or the interval between the pre-injection time Tp and the ignition time Ts is kept constant, as shown in graph of FIG. 10B. Therefore, when the pre-injection time Tp is advanced to a degree larger than the degree of advancement of the main injection time Tm in response to an increase in the engine load, the ignition time Ts is also advanced to a degree substantially equal to the degree of advancement of the pre-injection time Tp.

Next, the values of the control parameters used to perform the high load combustion control in the third load range R3 and the fourth load range R4 will be discussed. Firstly, the control parameters relating to the pre-injection and the main injection in these operation ranges will be discussed. As with the second load range R2, the third load range R3, is set as an operation range in which if only the main injected fuel quantity Sm is increased in response to increases in the engine load, there is a high probability that the amount of smoke generated may increase or the combustion may become unstable due to evaporation latent heat of the main injected fuel. Therefore, in the third load range R3, the pre-injected fuel quality Sp, the main injected fuel quantity Sm, the pre-injection time Tp, the main injection time Tm, and the ignition time Ts are changed in relation to changes in the engine load in a similar manner as in the second load range R2, as shown in FIGS. 10A and 10B. Thus, in the third load range R3, the pre-injected fuel quantity Sp and the main injected fuel quantity Sm are increased in response to increases in the engine load. When the engine load of the internal combustion engine 1 is the largest engine load in the third load range R3, the main injected fuel quantity Sm reaches the maximum main injected fuel quantity Smmax. The maximum main injected fuel quantity Smmax is the largest main injected fuel quantity with which stable combustion is ensured and excessive smoke generation can be prevented. The increase rate of the main injected fuel quantity Sm in the third load range R3 is lower than the increase rate of the main injected fuel quantity in the first load range R1, as in the second load range R2. In the third load range R3, the pre-injection time Tp is advanced in such a way that the higher the engine load is, the larger the first injection interval Di1 is, as in the second load range R2. Moreover, the higher the engine load is, the more the ignition time Ts is advanced to keep the ignition interval Ds constant.

The fourth load range R4 is set as an operation range in which it is difficult to increase the main injected fuel quantity Sm in response to increases in the engine load while keeping the amount of smoke generated within an allowable range and maintaining the combustion stability. Therefore, as shown in graph (a) in FIG. 10, in the fourth load range R4, the main injected fuel quantity Sm is fixed at the maximum main injected fuel quantity Smmax, and only the pre-injected fuel quantity Sp is increased in response to increases in the engine load. In this connection, the increase rate of the pre-injected fuel quantity Sp in the fourth load range R4 is higher than the increase rate of the pre-injected fuel quantity Sp in the second load range R2 and the third load range R3, as shown by line L21 in graph of FIG. 10A.

In the fourth load range R4, the relationship between the load-adapted injection quantity S0 and the pre-injected fuel quantity Sp is expressed by the following equation 3:

$$Sp=(S0-Smmax)/\alpha \quad \text{(equation 3)},$$

where $\alpha$ is the unburned residue rate of the pre-injected fuel, as in equation 2. In the fourth load range R4, the main injected fuel quantity Sm is fixed at the maximum main injected fuel quantity Smmax, as described above. Therefore, an appropriate value of the pre-injected fuel quantity Sp can be calculated by the above equation 3.

In the fourth load range R4, as shown in graph of FIG. 10B, the main injected time Tm is fixed at the proper injection time corresponding to the maximum main injected fuel quantity Smmax. In the fourth load range R4, since the pre-injected fuel quantity Sp is increased in accordance with increases in the engine load, there arises a possibility of smoke generation due to overlapping of the unburned residue of the pre-injected fuel and the main injected fuel. In view of this, in the fourth load range R4, the pre-injection time Tp is advanced in accordance with the increase in the pre-injected fuel quantity Sp, as shown in graph of FIG. 10B. In other words, the pre-injection time Tp is set in such a way that the first injection interval Di1 is increased in accordance with the increase in the engine load. Since the increase rate of the pre-injected fuel quantity is higher in the fourth load range R4 than in the second load range R2 and the third load range R3, the increase rate of the degree of advancement of the pre-injection time Tp (i.e. the rate of increase in the degree of advancement of the pre-injection time Tp to the increase in the engine load) is also higher in the fourth load range R4 than in the second load range R2 and the third load range R3. In consequence, the amount of smoke generated can be reduced.

In the fourth load range R4, the ignition time Ts is also advanced in accordance with the increase in the engine load, as shown in the graph of FIG. 10B. The increase rate of the degree of advancement of the ignition time Ts is lower than the increase rate of the degree of advancement of the pre-injection time Tp. Consequently, in the fourth load range R4, the ignition interval Ds increases with increasing engine load. This leads to a further increase in the unburned residue rate of the pre-injected fuel. Thus, the quantity of the unburned residue of the pre-injected fuel that is burned with the main injected fuel can further be increased. In the fourth load range R4, although the main injected fuel quantity is fixed at the maximum main injected fuel quantity as described above, increasing the quantity of the unburned residue of the pre-injected fuel enables the thermal efficiency of the internal combustion engine 1 to be maintained at satisfactory levels while attaining a required engine load.

Next, control parameters relating to the middle injection in the third load range R3 and the fourth load range R4 will be described. As shown by line L23 in graph of FIG. 10A, in the third load range R3 and the fourth load range R4, the middle injected fuel quantity Smid is fixed at a constant quantity smaller than the minimum pre-injected fuel quantity Spmin. Combustion of the middle injected fuel is started not by ignition by the ignition plug 5 but by flame that has already been generated by combustion of the pre-injected fuel. Therefore, the middle injected fuel can be burned by propagation of flame, even though the middle injected fuel quantity Smid is smaller than the minimum pre-injected fuel quantity Spmin. The middle injected fuel quantity Smid is determined in advance as such a quantity that can generate flame in a region that could be a flame ungenerated region if the middle injection were not performed.

In the third load range R3 and the fourth load range R4, since the middle injected fuel quantity Smid is fixed at a constant quantity, the second injection interval Di2 is also fixed. Then, the middle injection time Tmid is set relative to the main injection time Tm set to the proper injection time in such a way as to set the second injection interval Di2 that enables the middle injected fuel to be burned by propagation of flame generated by ignition of the pre-spray. In other words, the middle injection time Tmid is set in such a way that the middle injected fuel is burned by propagation of flame to extend the region around the fuel injection valve 6 in which flame is present at the main injection time. Therefore, as shown in graph of FIG. 10B, in the third load range R3, when the main injected fuel quantity Sm is increased with an increase in the engine load and the main injection time Tm is advanced accordingly, the middle injection time Tmid is also advanced together with the advancement of the main injection time Tm. In the fourth load range R4, since the main injection time Tm is fixed at a certain time, the middle injection time Tmid is also fixed at a certain time.

In this example, the middle injected fuel quantity Smid and the middle injection time Tmid are set in such a way that a most part of the middle injected fuel is burned by propagation of flame generated by pre-combustion. Therefore, the middle injected fuel is regarded as fuel that does not contribute to the power of the internal combustion engine 1. For this reason, the middle injected fuel is not taken into account in equations 2 and 3 presented above. However, even when the parameters relating to the pre-combustion are the same, the unburned residue rate of the pre-injected fuel in the case where the middle injection is performed and that in the case where the middle injection is not performed may be different from each other in some cases. In such cases, in the third load range R3 and the fourth load range R4, the pre-injected fuel quantity Sp and the main injected fuel quantity Sm are determined based on the unburned residue rate of the pre-injected fuel in the case where the middle injection is performed.

In both the third load range R3 and the fourth load range R4, the middle injected fuel quantity Smid is smaller than the minimum pre-injected fuel quantity Spmin. Therefore, even if the middle injected fuel is subjected to combustion by propagation of flame before the main injection time, its effect counteractive to the engine power of the internal combustion engine 1 is small.

<Combustion Control Flow>

Figure 11:
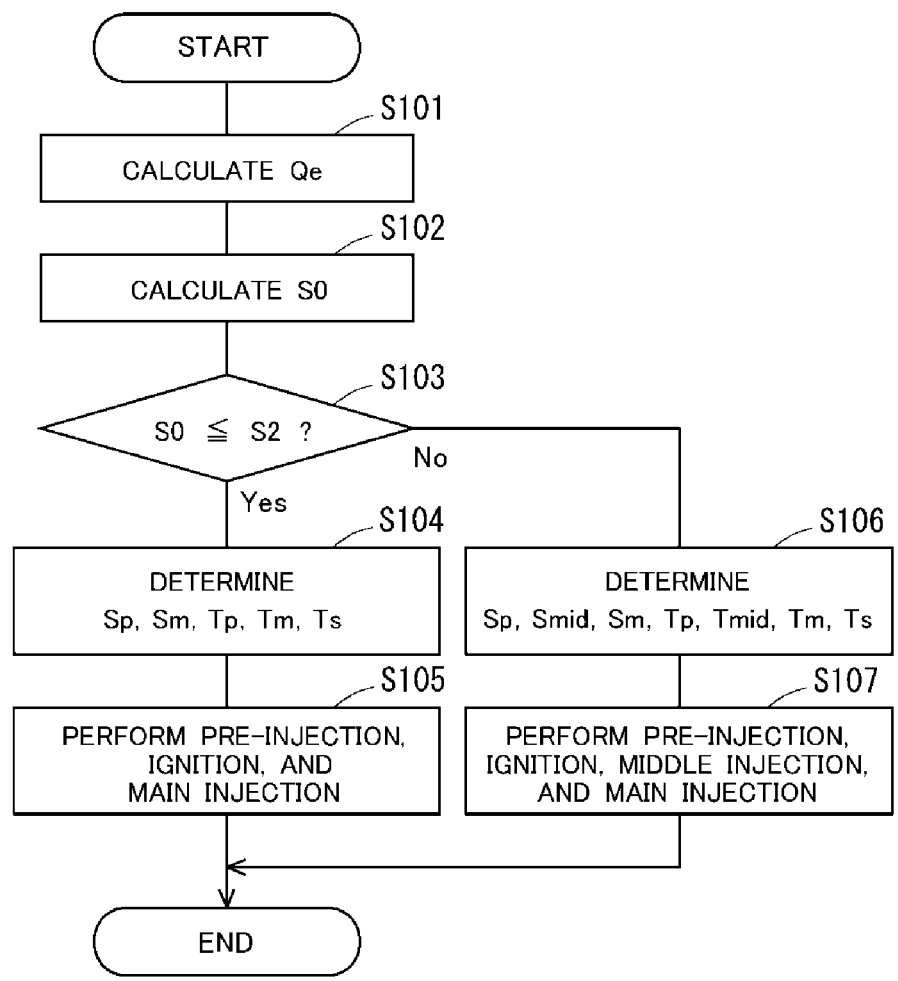
FIG. 11 is a flow chart of a control flow of the combustion control according to the example of the present invention.

A control flow of the combustion control according to this example will be described with reference to FIG. 11. FIG. 11 is a flow chart of the control flow of the combustion control according to this example. The control flow is stored in the ECU 20 in advance and carried out repeatedly at predetermined intervals by executing a control program stored in the ECU 20 while the internal combustion engine 1 is operating.

In the control flow in this example, firstly in step S101, the engine load Qe of the internal combustion engine is calculated based on the measurement value of the accelerator position sensor 22. Alternatively, the engine load of the internal combustion engine 1 may be calculated based on the air flow rate in the intake passage 70, namely based on the measurement value of the air flow meter 72, or the intake air pressure in the intake passage 70. Then, in step S102, a load-adapted injection quantity S0 is calculated based on the engine load Qe calculated in step S101. Specifically, the load-adapted injection quantity S0 corresponding to the engine load Qe is calculated using the control map represented by line L20 in graph of FIG. 10A. In this example, the relationship between the engine load and the load-adapted injection quantity S0 is recorded in the control map in which the load-adapted injection quantity S0 increases as the engine load increases, as represented by line L20.

Then, in step S103, it is determined whether or not the load-adapted injection quantity S0 calculated in step S102 is equal to or smaller than the second predetermined quantity S2. In other words, in step S103, it is determined whether the engine load Qe of the internal combustion engine 1 is in the first load range R1 or the second load range R2, or in the third load range R3 or the fourth load range R4. If the determination made in step S103 is affirmative, namely if the engine load Qe of the internal combustion engine 1 is in the first load range R1 or the second load range R2, the processing of step S104 is executed in order to perform the basic combustion control.

In step S104, the values of the pre-injected fuel quantity Sp, the main injected fuel quantity Sm, the pre-injection time Tp, the main injection time Tm, and the ignition time Ts used to perform the basic combustion control are determined using the control maps shown in FIGS. 10A and 10B. Then in step S105, the pre-injection and the main injection by the fuel injection valve 6 and ignition by the ignition plug 5 are performed according to the pre-injected fuel quantity Sp, the main injected fuel quantity Sm, the pre-injection time Tp, the main injection time Tm, and the ignition time Ts determined in step S104. Thus, the basic combustion control according to this example is implemented.

If the determination made in step S103 is negative, namely if the engine load Qe of the internal combustion engine 1 is in the third load range R3 or the fourth load range R4, the processing of step S106 is executed to perform the high load combustion control.

In step S106, the values of the pre-injected fuel quantity Sp, the middle injected fuel quantity Smid, the main injected fuel quantity Sm, the pre-injection time Tp, the middle injection time Tmid, the main injection time Tm, and the ignition time Ts used to perform the high load combustion control are determined using the control maps shown in FIGS. 10A and 10B. Then in step S107, the pre-injection, the middle injection, and the main injection by the fuel injection valve 6 and ignition by the ignition plug 5 are performed according to the pre-injected fuel quantity Sp, the middle injected fuel quantity Smid, the main injected fuel quantity Sm, the pre-injection time Tp, the middle injection time Tmid, the main injection time Tm, and the ignition time Ts determined in step S106. Thus, the high load combustion control according to this example is implemented.

The maps shown in FIGS. 10A and 10B are merely exemplary control maps used in the combustion control according to this example, and the relationships between the engine load of the internal combustion engine 1 and the control parameters of the basic combustion control and the high load combustion control are not limited to those shown in FIGS. 10A and 10B.

In the above-described high load combustion control, the middle injected fuel quantity is fixed at a constant quantity smaller than the minimum pre-injected fuel quantity Spmin regardless of the engine load of the internal combustion engine 1. Alternatively, the middle injected fuel quantity may be varied in accordance with the engine load of the internal combustion engine 1. For example, the middle injected fuel quantity may be increased in accordance with increases in the engine load. However, as described above, if the middle injected fuel quantity is excessively large, there is a possibility that self-ignition of fuel may occur before the main injection is performed. Therefore, even in the case where the middle injected fuel quantity is increased in accordance with increases in the engine load, the middle injected fuel quantity is kept smaller than the pre-injected fuel quantity in the same combustion cycle. This can prevent self-ignition of fuel from occurring before the main injection time as reliably as possible.

In the high load combustion control, the middle injected fuel quantity and the middle injection time may be controlled in such a way that a part of the middle injected fuel is not burned by combustion by propagation of flame but remains unburned. In this case, the unburned residue of the middle injected fuel is burned by self-ignition or diffusion combustion after the start of the main injection, as with the unburned residue of the pre-injected fuel. Consequently, the unburned residue of the middle injected fuel contributes to the power of the internal combustion engine 1. Therefore, in the case where the middle injected fuel quantity and the middle injection time is controlled in such a way that there remains unburned residue of the middle injected fuel, it is necessary to decrease the main injected fuel quantity by a quantity equal to the unburned residue. In this case, the relationship between the load-adapted injection quantity S0 and the main injected fuel quantity Sm is expressed by the following equation 4:

$$Sm=S0-(Sp\times\alpha+Smid\times\beta) \quad \text{(equation 4)},$$

where $\alpha$ is the unburned residue rate of the pre-injected fuel, and $\beta$ is the unburned residue rate of the middle injected fuel.

In this example, the middle injection is performed only in the third load range R3 and the fourth load range R4. However, the operation range in which the middle injection is to be performed is not necessarily limited to these operation ranges. For example, the middle injection may be performed also in the first load range R1 and the second load range R2.

In the case of internal combustion engines in which a tumble flow is generated in the cylinder or internal combustion engines in which a rotational flow such as a tumble or swirl flow is not generated also, there may possibly be a flame ungenerated region in the pre-combustion. Therefore, the internal combustion engines to which the present invention can be applied are not limited to internal combustion engines that are designed in such a way that a swirl flow is generated in the cylinder.

<Modification>

As described above, in the case where the middle injection is performed in addition to the pre-injection and the main injection in one combustion cycle, it is necessary to prevent self-ignition of fuel from occurring during the period after the middle injection is performed and before the main injection is performed. Therefore, the middle injected fuel quantity in the high load combustion control may be set to a value smaller than the smallest fuel injection quantity with which self-ignition of fuel will occur during the period after the middle injection is performed and before the main injection time. The above-mentioned smallest fuel injection quantity is calculated by the Livengood-Wu integral equation.

The Livengood-Wu integral equation is expressed by the following equation 5:

$$\left(\frac{1}{\tau}\right)_{P,T} = AP^n \exp\left(-\frac{E}{RT}\right), \quad \text{(equation 5)}$$

where $\tau$ is the ignition delay time, A is a vibration factor, n is the order of reaction, E is the activation energy, R is the universal gas constant, P is the pressure in the cylinder, and T is the temperature in the cylinder.

It is well known that self-ignition of fuel occurs at the time when the following equation 6 holds.

$$\int_{t=0}^{t=te} \left(\frac{1}{\tau}\right) P, T dt = 1, \quad \text{(equation 6)}$$

where t is the time elapsed after the start of fuel injection.

The vibration factor A is expressed by the following equation 7:

$$A = a \times F^b \quad \text{(equation 7)},$$

where a and b are constants, and F is the equivalence ratio (i.e. the theoretical air-fuel ratio divided by the air-fuel ratio in the cylinder).

The pressure P and the temperature T in the cylinder at the middle injection time varies depending on the operation state of the internal combustion engine 1. The values of the pressure P and the temperature T can be estimated based on an experiment or the like. Therefore, the equivalence ratio F at the time when the above equation 6 holds can be calculated from the estimated values of the pressure P and the temperature T at the middle injection time and the above equations 5 to 7. The quantity of air in the cylinder 2, which varies depending on the operation state of the internal combustion engine 1, can also be estimated based on an experiment or the like. The fuel injection quantity at the time when the above equation 6 holds, namely the smallest fuel injection quantity with which self-ignition of fuel will occur during the period after the middle injection is performed and before the main injection time, can be calculated from the equivalence ratio F at the time when the above equation 6 holds and the estimated quantity of air in the cylinder 2.

The middle injected fuel quantity is set to a value smaller than the smallest fuel injection quantity calculated as above with which self-ignition of fuel occurs during the period after the middle injection is performed and before the main injection time. Then, the occurrence of self-ignition of fuel during the time after the middle injection is performed and before the main injection is performed can be prevented with higher probability.

This application claims the benefit of Japanese Patent Application No. 2015-077072, filed on Apr. 3, 2015, which is hereby incorporated by reference herein in its entirety.

What is claimed is:

1. A control apparatus for an internal combustion engine comprising:
   a fuel injection valve that injects fuel radially from a location near a center of a combustion chamber of the internal combustion engine;
   an ignition plug whose position relative to said fuel injection valve is set in such a way that a part of fuel spray injected through said fuel injection valve passes through an ignition-capable region and the ignition plug can ignite the fuel spray directly; and
   a controller comprising at least one processor configured to perform pre-injection through said fuel injection valve at a pre-injection time during the compression stroke, ignite pre-spray, which is fuel spray formed by the pre-injection, by said ignition plug, and start to perform main injection through said fuel injection valve at a main injection time after the ignition of said pre-spray by said ignition plug and before a top dead center of the compression stroke that is set in such a way that combustion of the fuel injected by said main injection is started by flame generated by ignition of said pre-spray, thereby causing self-ignition of fuel to occur and causing at least a portion of the fuel injected by said main injection to be burned by diffusion combustion,
   wherein in at least a part of an operation range of the internal combustion engine, said controller is configured to perform middle injection in addition to said pre-injection and said main injection in one combustion cycle at a middle injection time after the ignition of said pre-spray by said ignition plug and before said main injection time to inject a quantity of fuel smaller than the quantity of fuel injected by said pre-injection in the same combustion cycle through said fuel injection valve, thereby causing the fuel injected by said middle injection to be burned by propagation of flame starting from flame generated by the ignition of said pre-spray,
   wherein said part of the operation range is an operation range in which the engine load of the internal combustion engine is higher than a predetermined load, and said controller is configured to perform said pre-injection and said main injection in one combustion cycle in the operation range in which the engine load of the internal combustion engine is lower than or equal to said predetermined load and is configured to perform said middle injection in addition to said pre-injection and said main injection in one combustion cycle in the operation range in which the engine load of the internal combustion engine is higher than said predetermined load,
   wherein said middle injection is not performed in the operation range in which the engine load of the internal combustion engine is lower than or equal to the predetermined load,
   wherein a main injection quantity of fuel injected by the main injection is larger than the quantity of fuel injected by the pre-injection and the quantity injected by the middle injection.

2. A control apparatus for an internal combustion engine according to claim 1, wherein the quantity of fuel injected by said middle injection is smaller than a smallest injected fuel quantity in said pre-injection in the entire operation range in which said pre-injection is performed.

3. A control apparatus for an internal combustion engine according to claim 1, wherein the quantity of fuel injected by said middle injection is smaller than a smallest fuel injection quantity with which self-ignition of fuel will occur in a period after said middle injection is performed and before said main injection time, said smallest fuel injection quantity being calculated using the Livengood-Wu integral equation based on the quantity of air in the cylinder, the pressure in the cylinder, and the temperature in the cylinder at said middle injection time.

* * * * *